March 16, 1943.  R. C. HANFORD  2,314,276
WORK SCHEDULING APPARATUS
Original Filed Aug. 10, 1939
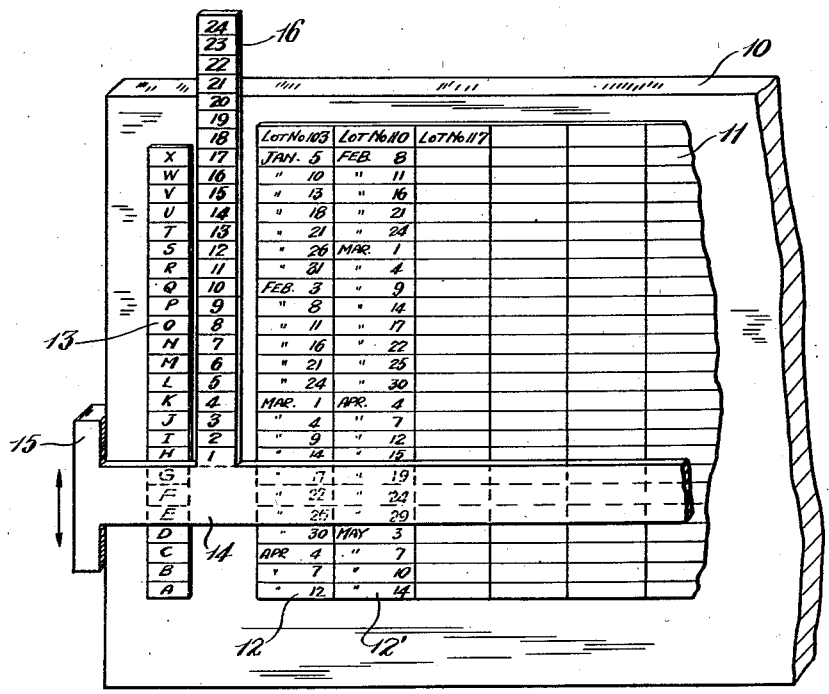
INVENTOR.
RAYMOND C. HANFORD
BY
*Kwis, Hudson & Kent*
ATTORNEYS ed Mar. 16, 1943

2,314,276

UNITED STATES PATENT OFFICE 2,314,276

WORK SCHEDULING APPARATUS

Raymond C. Hanford, Aurora, Ohio

Original application August 10, 1939, Serial No. 289,457. Divided and this application August 12, 1942, Serial No. 454,542

1 Claim. (Cl. 35—24)

This invention relates to improvements in work scheduling means, and comprises means of this character intended primarily for use in the manufacturing departments of a manufacturing plant, especially plants engaged in the manufacture of machines or other products in which a large number of parts are incorporated. The present application is a division of my copending application Serial No. 289,457, filed August 10, 1939.

In order to promote the greatest efficiency, prevent unnecessarily large in-process inventory in some instances, and a dearth of material in others, and to enable the management and the sales organization to know with a fair degree of accuracy when deliveries upon given products may be made, an effective planning and scheduling of work in the manufacture and assembly of the parts must be employed. The means of the present invention in connection with proper identification of the parts in the orders given to a foreman enables such foreman to determine readily when each operation upon a given set of parts must be completed in order to maintain the schedule.

In carrying out the invention, the operations to be performed in the manufacture of a given set or "lot" of parts or work pieces are divided into a series of classes each of which is divided into a series of subclasses, and each operation is identified by suitable symbols to indicate the particular class and subclass to which it belongs. One series of symbols is used for classes and another for subclasses, or, if desired, a single series of symbols, such as the numerical series 1, 2, 3, etc., may be applied both to classes and subclasses. In either case each operation to be performed is identified with one class and with one subclass of that class by means of two characteristics, namely, the corresponding class symbol and subclass symbol. Thus a class may consist of all operations to be performed on a given group of parts or work pieces and a subclass may consist of all similarly identified operations on the work pieces of that group. In accordance with the preferred use of the invention I put in a given class all parts the work upon which is scheduled to begin on a given date.

When a foreman receives in his department a part or a number of identical parts upon which certain operations are to be performed in that department, he commonly also receives a "shop rider," such as a card, envelope, or other printed form, which bears the engineering part number or other identification of the parts concerned and which also bears a list of the operations to be performed thereon. In carrying out the present invention, such rider also bears one of the class symbols above referred to and, adjacent each operation, one of the subclass symbols. Thus each operation listed on the rider is identifiable as to its particular class and subclass. The apparatus forming the subject of the invention is employed in determining from this information alone when each operation is to be performed.

The principal object of the invention, therefore, is the provision of simple and readily understandable means for listing the operations to be performed upon the various parts or items of a given set or lot of parts entering into a product and the dates or times when such operations are to be performed.

Other objects and features of novelty will appear as I proceed with the description of that embodiment of the invention which, for the purposes of the present application, I have illustrated in the accompanying drawing, in which The single figure is a perspective view of an apparatus embodying the invention.

Referring to the drawing, a rectangular board 10 is used to support a sheet 11 bearing time scales 12, 12', etc. These scales are made up for each lot of parts to be manufactured, and show the period over which the work of a given lot is to be spread, and, in connection with the class and subclass indications hereafter referred to, these scales show the dates when particular operations are to be completed.

The board 10 also supports a column of symbols 13, the divisions between the spaces in this column being in alignment with the divisions between the entries in the time scales, so that the date entries may be lined up in register with the symbols in the column 13.

The time scales as shown are printed upon a single sheet of paper which is removable and replaceable with a different sheet from time to time as changes in the schedule are called for. It is within the purview of the invention to print each scale upon a separate strip, making the strips not only removable and replaceable but shiftable up or down in order to effect changes. However, I have found that it is preferable to print all of the scales upon a single sheet so that when a change of schedule becomes desirable a new sheet may be substituted for the sheet previously in use, thereby reducing to a minimum the risk that an occasional scale in some department may be incorrectly positioned.

It is to be noted that my invention permits the use of identical scales in all of the departments of a plant. If a uniform change of schedule should become necessary for all work lots, this may be effected by shifting either the symbol column 15 or the sheet 11 vertically.

A straightedge member 14 is mounted to move over board 10 parallel to itself in an up and down direction, being guided by a right angle head 15 which runs against the vertical edge of the board. Attached to or integral with straightedge member 14 is an upright 16 upon which is printed a column of symbols. In the present instance, the column 13 is used for class symbols and the column 16 for subclass symbols, although with some minor additional changes these columns may be interchanged if desired. In the disclosed construction, an operation would be identified by a letter and a number, as, for example, O 8 or R 14. A letter and a number must be brought into a predetermined relationship by movement of the straightedge member 14 in order to show the date for completion of the operation so designated.

The method of using the apparatus is as follows: Move the straightedge member 14 up or down to bring the subclass symbol of the operation in question opposite the class symbol, and then read the date on the time scale for the lot in question immediately above the straightedge. For example, if it is desired to determine the performance date for the eighth operation upon parts in class O of lot 103, the straightedge is moved to bring the numeral 8 opposite the letter O, as illustrated in the drawing, whereupon a glance at the date entry of time scale 12 directly above the straightedge shows the answer to be March 14. If similar information should be desired with respect to lot 110, the answer would be read off scale 12'.

The group of parts to which a class symbol is applied may be formed or selected in any desired manner. For example, a class may include all parts work upon which is to begin on a specified date. Thus the class may include parts which are identical or otherwise and which require the same or different numbers of operations. However, a given class symbol should not be used for parts requiring more operations than the number of subclasses which can be brought into register with the class symbol. For example, any one of the subclass symbols 1 to 24, inclusive, may be brought into register with class symbol X, but subclass symbols 1 and 2 are the only ones which may be brought into register with class symbol B, as the registering of any higher subclass symbols with that class symbol would bring the straightedge below the time scales. Class B therefore may be used only for parts requiring one or two operations, while class X may be used for parts requiring any number of operations up to twenty-four.

Work operations may be classed upon some quite different basis if desired, as for instance upon the basis of parts made from castings, from forgings, from bar stock, etc., or even according to a purely arbitrary scheme, depending upon convenience in planning the work preparatory to making up the time scales. The apparatus of course conveys no information as to the character of the various operations to be performed. That information must be supplied by other means.

Having thus described my invention, I claim:

In a device operable to communicate information of the scheduled time of performance of each of a multiple of work operations entering into a plurality of sets or lots of work, the operations entering into each set or lot being classifiable into classes and subclasses, a support, means mounted thereon bearing a plurality of series of equal graduations adapted to constitute time scales, said series of graduations being arranged side by side, one for each lot of work, means mounted on said support bearing appropriate designations marking off spaces for class indicia, said spaces corresponding in depth to said graduations and arranged in columnar form, and a transverse straightedge movable lengthwise of said time scales, said straightedge carrying a member parallel to said time scales bearing appropriate designations marking off spaces also corresponding in depth to said graduations and adapted for receiving subclass indicia, whereby selected class and subclass indicia may be brought into registration whereupon the straightedge will mark off the corresponding indicia on the various time scales.

RAYMOND C. HANFORD.